United States Patent
Gessner et al.

(10) Patent No.: US 7,742,483 B2
(45) Date of Patent: Jun. 22, 2010

(54) METHOD AND RADIO SATION FOR TRANSMITTING DATA PACKETS IN A RADIO-COMMUNICATION SYSTEM

(75) Inventors: Christina Gessner, Müchen (DE); Norbert Kroth, Potsdam (DE); Axel Meiling, Berlin (DE); Fariba Raji, Vienna (AT); Jörg Schniedenharn, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 1281 days.

(21) Appl. No.: 10/487,412

(22) PCT Filed: Aug. 22, 2002

(86) PCT No.: PCT/DE02/03081

§ 371 (c)(1),
(2), (4) Date: Feb. 23, 2004

(87) PCT Pub. No.: WO03/019853

PCT Pub. Date: Mar. 6, 2003

(65) Prior Publication Data

US 2004/0190523 A1 Sep. 30, 2004

(30) Foreign Application Priority Data

Aug. 22, 2001 (DE) .................. 101 41 092

(51) Int. Cl.
*H04L 12/28* (2006.01)
(52) U.S. Cl. .................. 370/395.52; 370/242; 370/310; 370/335; 370/395; 370/469; 455/575; 455/67.1

(58) Field of Classification Search .................. 370/216, 370/229, 235, 329, 335, 338, 394, 466, 537, 370/242, 280, 310, 313, 347, 349, 392, 465, 370/469; 714/18, 708, 748, 749, 751, 774; 455/67.1, 575

See application file for complete search history.

(56) References Cited

U.S. PATENT DOCUMENTS

| | | | | |
|---|---|---|---|---|
| 5,754,754 A | * | 5/1998 | Dudley et al. | 714/18 |
| 5,896,394 A | * | 4/1999 | Fukuda | 714/712 |
| 6,058,106 A | * | 5/2000 | Cudak et al. | 370/313 |
| 6,076,181 A | * | 6/2000 | Cheng | 714/748 |
| 6,134,693 A | * | 10/2000 | Fukuda | 714/750 |
| 6,167,273 A | * | 12/2000 | Mandyam | 455/450 |

(Continued)

FOREIGN PATENT DOCUMENTS

JP 11-313047 4/1998

(Continued)

OTHER PUBLICATIONS

Translation of Japanese Office Action dated Aug. 2, 2007.

(Continued)

*Primary Examiner*—Ayaz R Sheikh
*Assistant Examiner*—Andrew C Lee
(74) *Attorney, Agent, or Firm*—Staas & Halsey LLP

(57) ABSTRACT

A method transmits data packets in a radio-communication system. A criterion is associated with a data packet received by a radio station, and a data packet which is correctly received is transmitted to another device and/or protocol layer when the criterion has been met.

7 Claims, 2 Drawing Sheets

U.S. PATENT DOCUMENTS

| | | | |
|---|---|---|---|
| 6,317,430 B1 * | 11/2001 | Knisely et al. | 370/394 |
| 6,473,399 B1 * | 10/2002 | Johansson et al. | 370/229 |
| 6,496,481 B1 * | 12/2002 | Wu et al. | 370/242 |
| 6,496,520 B1 * | 12/2002 | Acosta | 370/474 |
| 6,611,515 B1 * | 8/2003 | Balachandran et al. | 370/349 |
| 6,615,382 B1 * | 9/2003 | Kang et al. | 714/748 |
| 6,697,352 B1 * | 2/2004 | Ludwig et al. | 370/349 |
| 6,704,898 B1 * | 3/2004 | Furuskar et al. | 714/751 |
| 6,744,766 B2 * | 6/2004 | Alapuranen | 370/394 |
| 6,760,860 B1 * | 7/2004 | Fong et al. | 714/4 |
| 6,816,478 B1 * | 11/2004 | Laroia et al. | 370/349 |
| 6,839,566 B2 * | 1/2005 | Casaccia et al. | 455/515 |
| 6,895,010 B1 * | 5/2005 | Chang et al. | 370/394 |
| 6,928,294 B2 * | 8/2005 | Maggenti et al. | 455/518 |
| 6,931,569 B2 * | 8/2005 | Fong et al. | 714/18 |
| 6,956,855 B1 * | 10/2005 | Chang | 370/394 |
| 6,975,629 B2 * | 12/2005 | Welin | 370/392 |
| 6,977,888 B1 * | 12/2005 | Frenger et al. | 370/218 |
| 7,230,937 B2 * | 6/2007 | Chi et al. | 370/329 |
| 2001/0007137 A1 * | 7/2001 | Suumaki et al. | 714/18 |
| 2002/0001296 A1 * | 1/2002 | Lee et al. | 370/338 |
| 2002/0021698 A1 * | 2/2002 | Lee et al. | 370/394 |

FOREIGN PATENT DOCUMENTS

| | | |
|---|---|---|
| WO | WO01/59979 A2 | 8/2000 |
| WO | WO00/60799 | 10/2000 |
| WO | WO00/72498 | 11/2000 |

OTHER PUBLICATIONS

Translation of comments describing how JP 11-313-47 relates to Japanese claims.

* cited by examiner

METHOD AND RADIO SATION FOR TRANSMITTING DATA PACKETS IN A RADIO-COMMUNICATION SYSTEM

CROSS REFERENCE TO RELATED APPLICATIONS

This application is based on and hereby claims priority to PCT Application No. PCT/DE02/03081 filed on 22 Aug. 2002 and German Application No. 101 41 092.1 filed on Aug. 22, 2001, the contents of which are hereby incorporated by reference.

BACKGROUND OF THE INVENTION

The invention relates to a method and a radio station for transmitting data packets in a radio communication system, in particular in a mobile radio system.

In radio communication systems, information such as voice, image information, or other data, is transmitted with the aid of electromagnetic waves over a radio interface between a sending and a receiving radio station (base station and mobile station). Said waves are radiated using carrier frequencies lying in the frequency band provided for the respective system. Frequencies in the frequency band of approximately 2,000 MHz are provided for future mobile radio systems employing CDMA or TD/CDMA transmission methods over the radio interface, for example the UMTS (Universal Mobile Telecommunications System) or other 3rd generation systems. Frequency Division Multiplex Access (FDMA), Time Division Multiplex Access (TDMA), or a method known as Code Division Multiplex Access (CDMA) here serve to distinguish the signal sources.

As part of the process of specifying the UMTS standard, methods are currently being defined which are to be optimized for packet transmissions. An example of this is what is termed High Speed Downlink Packet Access (HSDPA) for the FDD (Frequency Division Duplex) and TDD (Time Division Duplex) mode of the UMTS standard. These methods are to be capable of catering for services with different Quality of Service (QoS) requirements. A base station (NB: Node B) is here responsible for what is termed the scheduling of different users' data and for what is termed the retransmission, which is to say the repeated transmission, of incorrectly received data packets using what is termed a hybrid ARQ process. Hybrid ARQ methods derive their advantage from the fact that incorrectly received data packets are stored in a storage facility in the receiving device so they can be combined with succeeding, repeated and, where applicable, modified transmissions of the data packets. In contrast to known pure ARQ methods where faulty data packets are rejected at the receiving side, this advantageously also makes it possible to benefit from the data packets already received to increase the quality of reception.

In the receiving device it is necessary for the received data to be forwarded to higher protocol layers in the correct sequence, which is to say in the sequence originally present at the sending side. Since, owing to retransmissions for instance, the time sequence of the correctly received data packets can become mixed-up during transmission over the radio interface, the original sequence has to be restored at the receiving side. Customarily implemented for this in the receiving device is a reordering buffer which continues to store a number of data packets until a correct sequence can be ensured. If, for instance, a second and a third data packet are correctly received while correct reception of a first data packet is still awaited, the two data packets will remain stored until the first data packet has also been correctly received. The data packets are then forwarded in the original sequence to higher protocol layers in the receiving device.

Because a base station potentially has to control and carry out transmissions of data packets to a large number of users in parallel, also referred to as 'user scheduling', long delays may disadvantageously arise until a repeatedly transmitted data packet has been correctly received. It may in such cases no longer be possible to maintain the pre-specified Quality of Service, and delays will occur that are unpleasant for the user on the receiving side.

SUMMARY OF THE INVENTION

The inventors propose a method and a radio station which improve the known methods for packet data transmission.

In order to optimize, for instance, compliance with pre-specified Quality-of-Service parameters, the inventors propose that a correctly received data packet is forwarded to another device and/or protocol layer when a criterion has been met.

It is advantageously ensured by the method that a correctly received data packet can be further processed on the receiving side even when a preceding data packet has not yet been correctly received. In the case outlined by way of example at the beginning, it may be more advantageous in terms of maintaining the pre-specified Quality of Service to dispense with receiving the first data packet and to forward the correctly received second and third data packet accordingly to the higher protocol layer or, as the case may be, other device when the criterion has been met. The third data packet can, where applicable, also be forwarded even before the criterion has been met as the second data packet has also been correctly received and forwarded. It would accordingly not be an essential requirement for the criterion to be met if a preceding data packet has been correctly received in the original sequence and forwarded. This advantageously avoids a further delay in the forwarding of correctly received data packets on account of meeting the criterion.

According to a first development the criterion comprises knowledge on the receiving side that a data packet which has not yet been correctly received is not being sent again by the sending radio station. Said knowledge can be gained, for instance, by signaling on the part of the sending radio station or on the basis of a pre-specified maximum number of retransmissions of the data packet which has not been received correctly.

According to a further development the criterion comprises a pre-specified time interval. Said interval controlled by, for example, a timer is assigned to each received data packet. On expiration of the time interval a correctly received data packet will be forwarded to the other device and/or protocol layer even if a preceding data packet has not yet been correctly received. The time interval accordingly defines a period of time giving a preceding data packet time for correct reception. The time interval can, according to a development, be dimensioned as a function of a Quality of Service of the data transmitted in the data packets, the interval being dimensioned shorter in the case, for example, of real-time services such as telephony or video transmissions, where a higher bit error rate is acceptable, than in the case of non-real-time services requiring a low bit error rate.

According to further embodiments, a data packet which has not been correctly received by the time the time interval expires is not forwarded to the other device and/or protocol layer. As a consequence of this, the ARQ process for the retransmission of data packets which have not been correctly received can be terminated on the part of the receiving radio station by, for example, not signaling a new request for a data packet but, instead, positively signaling the data packet's successful reception.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
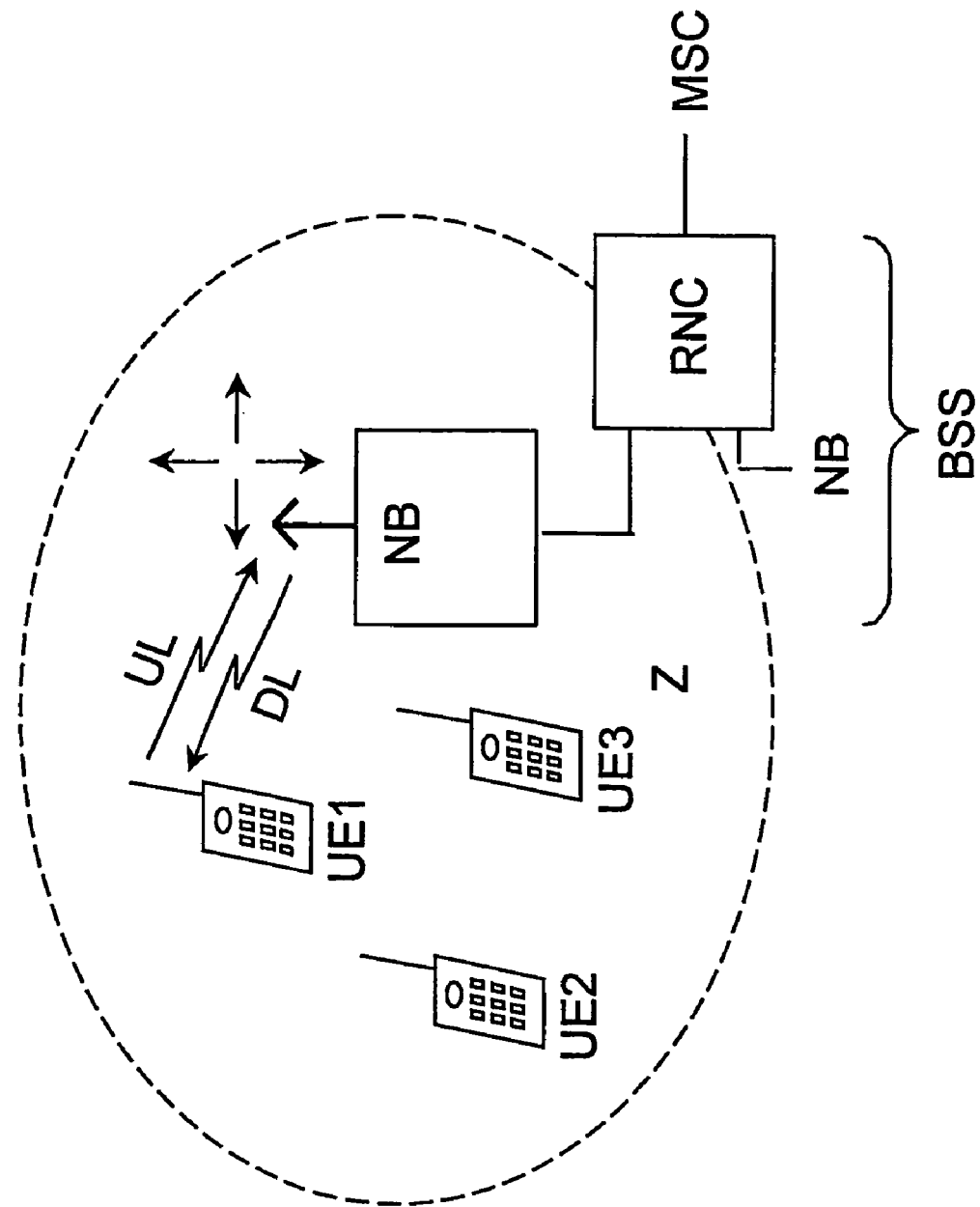
FIG. 1 is a block diagram of a radio communication system.

Reference will now be made in detail to the preferred embodiments, examples of which are illustrated in the accompanying drawings, wherein like reference numerals refer to like elements throughout.

FIG. 1 shows an exemplary radio communication system (Z) having a plurality of MSC (Mobile Switching Center) switching facilities which are interconnected. At least one of the MSC switching facilities generally provides access to further communication systems such as to a public switched telephone network (PSTN). Base stations (BSS) such as NB (Node B) are connected to the MSC switching facilities as send/receive facilities of the radio communication system. The base stations NB are linked via communication connections to terminals, specifically to user terminals UE (User Equipment), over a radio interface, it being possible for the terminals to be mobile or stationary terminals.

Between the base station NB shown in FIG. 1 and the user terminals UE located within the radio provisioning area of the base station NB are unidirectional or, as the case may be, bi-directional communication connections with an uplink UL from the user terminal UE to the base station NB and/or a downlink DL from the base station NB to the user terminal UE.

Figure 2:
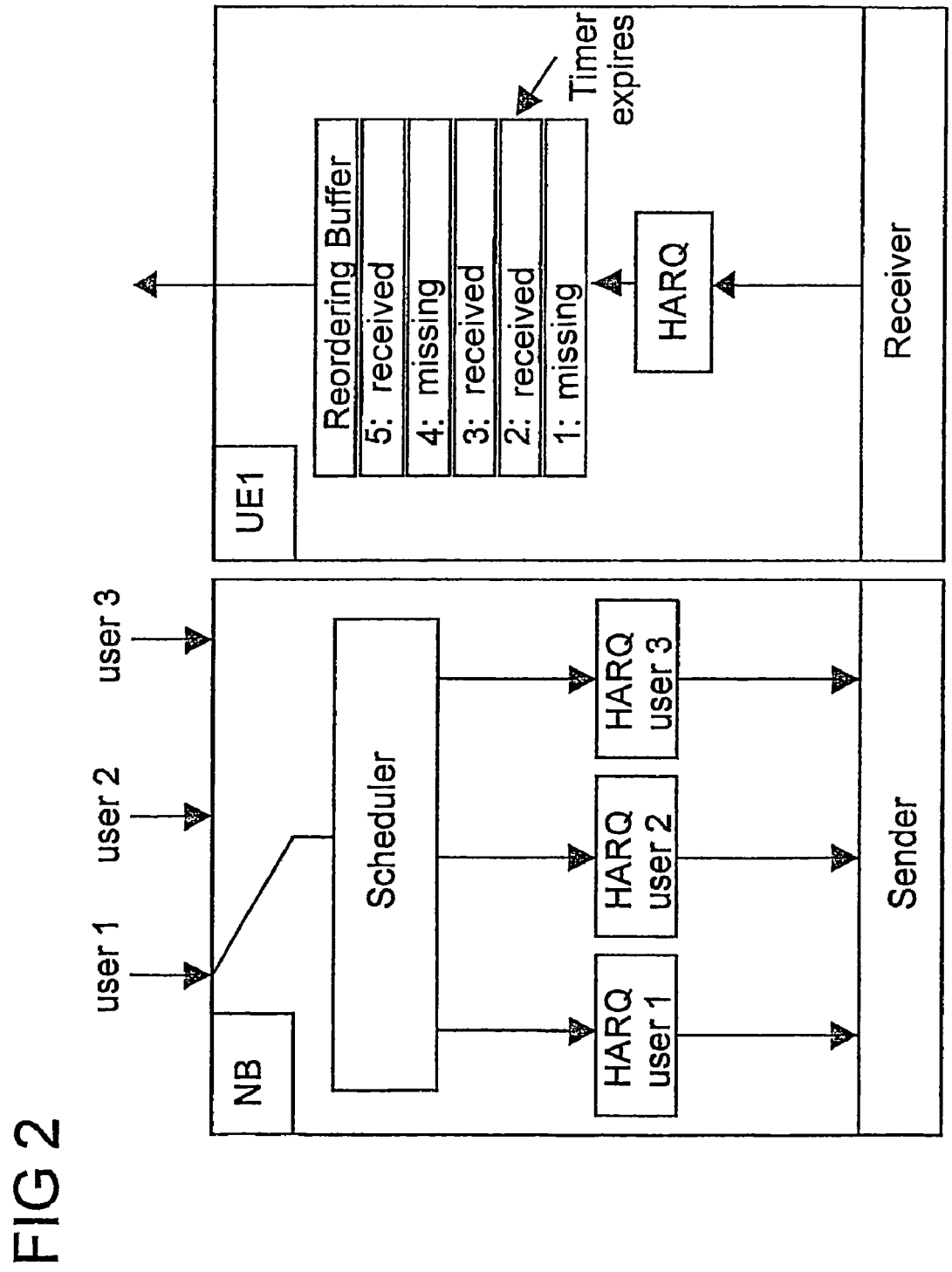
FIG. 2 is a schematic representation of the procedural flows according to one potential embodiment for the invention in a sending and a receiving radio station.

FIG. 2 is a schematic of functionalities and facilities of a sending radio station, in this example a base station NB, and of a receiving radio station, in this example a user terminal UE. To implement the method, the same functionalities can also be realized, where applicable in a modified or simplified form, in the respective other radio station. Data streams of currently established connections for user 1 to user 3 are routed from the network side to the base station NB. As the data packets are sent to the user terminals UE1 . . . UE3 in, for example, a common physical transmission channel, time control of the respective transmission is realized by what is termed a scheduler. The data packets are furthermore assigned a user-specific HARQ user 1 . . . 3 HARQ process which controls a retransmission of data packets which have not been correctly received.

The user terminal UE1 of user 1 also receives the data packets sent by the base station NB and intended for user 1 with the incorporation of a HARQ process. On being received, a data packet is stored in a buffer store or, as the case may be, a reordering buffer which, as described at the beginning, restores the original sequence of the data packets before they are forwarded to another device or, as the case may be, protocol layers. FIG. 2 shows by way of example the situation in which user terminal UE1 has stored five data packets 1 . . . 5 of a data stream in the reordering buffer. The number 1 . . . 5 of the data packet and the current status 'received' or, as the case may be, 'missing' is entered in the reordering buffer. At the time under consideration, user terminal UE1 has correctly received data packets 2, 3, and 5 (status 'received') whereas data packets 1 and 4 have not yet been received or, as the case may be, have not yet been received correctly (status 'missing').

Each data packet 1 . . . 5 in the reordering buffer is assigned a timer or, as the case may be, a time interval. The time interval is dimensioned for example as a function of Quality-of-Service requirements of the data stream, which is to say that services with stringent requirements in terms of short transmission delay, such as real-time services, for instance, can have a shorter time interval than services with less stringent requirements in terms of transmission delays, such as non-real-time services, for instance.

In the situation shown in FIG. 2, the assigned time interval for data packet 2 expires (Timer expires), which is to say the packet has to be forwarded to another protocol layer or, as the case may be, another device if an unacceptable transmission delay and an infringement of the Quality of Service is to be avoided. According to the method known from the related art, data packet 2 could not be forwarded because data packet 1 has not yet been correctly received, meaning it would not be possible to comply with the agreed Quality of Service. However, the inventors propose that the correctly received data packets 2 and 3 are still forwarded despite the missing data packet 1. Data packet 3 can, where applicable, also be forwarded before the relevant time interval has expired because the preceding data packet, which is to say data packet 2, has also been correctly received and forwarded. The delay caused by the respective time interval can consequently advantageously be avoided.

Jointly with or separately from the forwarding of data packet 2 to the other device or, as the case may be, other protocol layer, it is possible to signal to the device or layer that data packet 1 has not been correctly received within the time interval assigned to it or, as the case may be, by the expiration time of succeeding data packet 2. If data packet 1 is correctly received after the time interval has expired, it will be rejected or forwarded directly to the other protocol layer or, as the case may be, other device. The receiving user terminal UE1 can furthermore halt the ARQ process by signaling to the sending base station that there should be no further transmissions of the data packet 1 or that data packet 1 has been successfully received, as a consequence of which a new transmission will not be initiated on the sending side. Data packet 5 will not yet be forwarded in the situation shown as the assigned time interval has not yet expired and the preceding data packet 4 has not yet been received or, as the case may be, has not yet been received correctly.

The HARQ concepts mentioned are especially suitable for guaranteeing efficient communication with a fast data rate. Data packets are usually sent by the sending device NB to a receiving device UE, and the receiving device UE sends ACK (Acknowledge) or NACK (Negative Acknowledge) messages to confirm or not confirm error-free receipt of the packets.

Problems arise when received ACKs and NACKs are misinterpreted in the sending radio station NB. If a data packet has not been correctly received by the receiving radio station UE1, the station will send a NACK to the sending radio station NB and then expect retransmission of the data packet initiated by the HARQ protocol.

If, however, the sending radio station NB misinterprets the NACK as an ACK, the station will assume that the data packet has been received correctly by the receiving radio station UE1 and will transmit a subsequent data packet to the receiving radio station UE1. This mechanism is executed in the protocol layers responsible for the HARQ. In this situation the receiving radio station UE1 waits for a specific length of time for the data packet to be retransmitted. This can, however, be terminated if data packets which are not to be transmitted until after the missing data packet has been retransmitted have already been received from the sending radio station NB. Depending on the HARQ protocol concept employed, first transmissions and retransmissions of a data packet can be identified by transmission sequence numbers, channel numbers and/or indications of whether a data packet is a first transmission or already a retransmission. Also conceivable is the setting up of a time interval after which a data packet must have been retransmitted. The time interval can furthermore be relevant for, for example, determining a data packet's validity with reference to a maximum transmission time for packets in cases where a large number of data packets have since been transmitted for other users and the number of retransmissions for the still missing data packet has not yet attained the maximum. This will allow the receiving radio station UE1 to establish after a specific period of time that the sending radio station NB will not be sending the missing data packet again.

Where applicable, higher protocol layers such as, for example, the RLC (RLC: Radio Link Control) retransmission protocol in the case of an HARQ protocol controlled by the MAC (Medium Access Control), can recognize in the receiving radio station UE1 that a data packet has not been received or, as the case may be, has not been received correctly, and can request a retransmission. This procedure can, however, disadvantageously result in delays as it may not take an HARQ protocol implemented on lower protocol layers into consideration if, for example, a transmission window is observed or if data packets are reordered by the HARQ protocol. The request for a retransmission by higher protocol layers in the receiving radio station UE1 may furthermore be dependent on configured trigger conditions, which is to say it may only be possible for the request to be made periodically or after a number of missing data packets have been recognized.

A method is described below which facilitates faster recognition of an unsuccessful retransmission of a missing data packet or of a data packet which has not been received correctly and makes possible an immediate request for retransmissions by higher protocol layers.

It is proposed that the protocol layer responsible in the receiving radio station UE1 for executing the HARQ protocol informs the higher protocol layers that a NACK which was sent owing to a data packet's not having been received or not having been correctly received was probably misinterpreted by the sending radio station NB as an ACK as soon as a situation has arisen corresponding to the examples described in the foregoing. In this case the higher protocol layers in the receiving radio station UE1 are aware that the missing data packet will not be re-sent by the sending radio station NB within the normal HARQ process, notwithstanding the current status of the HARQ protocols. The higher protocol layers in the receiving radio station UE1 can then immediately initiate appropriate action. Examples of such action include requests for retransmission to the sending radio station NB via appropriate retransmission protocols of the higher protocol layers in cases where the HARQ protocol of the lower protocol layers is unable to successfully re-send a data packet. Thanks to this method, the higher protocol layers advantageously do not have to wait until the HARQ protocol forwards the received packets, possibly without the missing data packets. This fast initiation of a necessary retransmission of a data packet by higher protocol layers independently of the HARQ protocol being applied advantageously facilitates faster throughput of data packets and shorter transit times.

An example of the method is the HARQ protocol in an HSPDA system which is executed in the MAC between the user terminal UE and the base station NB. In this case the MAC of the user terminal UE signals to the RLC of the user terminal UE that a data packet is missing in the HARQ protocol or, as the case may be, has not been received correctly. Under the control of this signaling the RLC protocol will prompt a retransmission of the missing data packet.

The invention has been described in detail with particular reference to preferred embodiments thereof and examples, but it will be understood that variations and modifications can be effected within the spirit and scope of the invention.

The invention claimed is:

1. A method for transmitting data packets in a radio communication system, comprising:
   sequentially transmitting at least two data packets from a transmitting radio station via a radio interface;
   storing said at least two data packets in a receiving radio station for restoration of a transmit-side sequence, before forwarding to a further device and/or a protocol layer of the receiving radio station;
   requesting repeat transmission using a hybrid automatic repeat request (HARQ) method if a first data packet of the at least two sequentially transmitted data packets is not correctly received;
   assigning a predetermined time interval, to a correctly received second of the at least two data packets; and
   forwarding the correctly received second data packet to the further device and/or the protocol layer, after the assigned predetermined time interval elapses, even if the first data packet has not yet been correctly received.

2. The method according to claim 1, in which the first data packet which has not been correctly received until the predetermined time interval elapsed is not forwarded to the further device and/or the protocol layer of the radio station.

3. The method according to claim 2, in which the hybrid automatic repeat request (HARQ) method is terminated after the predetermined time interval elapsed.

4. The method according to claim 1, wherein length of the predetermined time interval assigned to the correctly received second data packet is a function of a quality of service.

5. The method according to claim 1, further comprising signaling to the further device and/or the protocol layer of the radio station when forwarding the correctly received second data packet that the first data packet was not correctly received.

6. A radio station of a radio communication system, comprising:
   means for receiving at least two data packets transmitted sequentially from a transmitting radio station;
   means for storing the received at least two data packets for restoration of a transmit-side sequence and subsequent forwarding to a further device and/or protocol layer of the radio station;
   means for requesting repeat transmission of an incorrectly received first of the at least two sequentially transmitted data packets by means of a hybrid automatic repeat request (HARQ) method;
   means for assigning a predetermined time interval to a correctly received second of the at least two data packets; and
   means for forwarding the correctly received second data packet after the assigned time interval elapses, to the further device and/or protocol layer, even if the first data packet has not yet been correctly received.

7. A radio station in a radio communication system using a hybrid automatic repeat request (HARQ) method, comprising:
- a HARQ unit to receive data packets of a sequence transmitted from a source device in the radio communication system and to request the source device to retransmit an incorrectly received or missing packet; and
- a storing unit to store the data packets until forwarded, to determine whether each of the data packets is correctly received or whether any data packet is missing, and to forward the received data packets to anther device in the communication system and/or another protocol layer in the radio station, wherein the storing unit assigns a predetermined time interval to each correctly received data packet that follows an incorrectly received or missing data packet, and, after the predetermined time interval elapses, forwards the correctly received data packet, even if an instance of the incorrectly received data packet has not yet been received.

* * * * *